United States Patent [19]

Kronstadt

[11] Patent Number: 4,544,055
[45] Date of Patent: Oct. 1, 1985

[54] OIL SHUT-OFF DEVICE FOR WET CLUTCHES

[75] Inventor: Victor Kronstadt, Hagerstown, Md.

[73] Assignee: Mack Trucks, Inc., Allentown, Pa.

[21] Appl. No.: 413,270

[22] Filed: Aug. 31, 1982

[51] Int. Cl.$^4$ .................. F16D 13/56; F16D 13/72
[52] U.S. Cl. .................. 192/70.12; 192/70.29; 192/70.3; 192/113 B
[58] Field of Search ............ 192/18 A, 70.12, 70.29, 192/85 C, 98, 99 S, 111 A, 113 B

[56] References Cited

U.S. PATENT DOCUMENTS

| | | | |
|---|---|---|---|
| 2,734,609 | 2/1956 | Fritzsch | 192/85 C |
| 3,351,169 | 11/1967 | McIndoe | 192/85 |
| 3,404,761 | 10/1968 | Jaeschke et al. | 192/113 B |
| 3,474,888 | 10/1969 | Carlson et al. | 192/113 B |
| 3,540,557 | 11/1970 | Hasselbacher et al. | 192/113 B |
| 3,773,157 | 11/1973 | Koch, Jr. et al. | 192/113 B |
| 3,823,802 | 7/1974 | Winzeler et al. | 192/113 B |
| 4,134,483 | 1/1979 | Horsch | 192/113 B |
| 4,142,619 | 3/1979 | Spokas | 192/113 B |
| 4,270,647 | 6/1981 | Leber | 192/113 B |
| 4,321,990 | 3/1982 | Koch, Jr. | 192/12 A |
| 4,373,622 | 2/1983 | Michael | 192/85 AA |

Primary Examiner—Rodney H. Bonck
Attorney, Agent, or Firm—Bernard, Rothwell & Brown

[57] ABSTRACT

Oil shut-off in a wet clutch is performed by the sliding movement of an actuator collar during engagement with pressure plate release levers. An end lip portion of the actuator collar slides over radial openings in a coaxial oil feed tube to terminate oil flow after the clutch plates have been disengaged. Complete oil shut-off substantially reduces viscous drag between the clutch plates during disengagement. Oil flow is restored prior to complete engagement of the clutch plates by return movement of the actuator collar exposing the openings in the coaxial feed tube to the interior oil feed channel in the actuator collar.

6 Claims, 6 Drawing Figures

OIL SHUT-OFF DEVICE FOR WET CLUTCHES

TECHNICAL FIELD

The present invention relates to wet clutches having a cooling flow of lubricating oil passing over the clutch plates, and particularly to such clutches wherein the oil flow is cut off during disengagement of the clutch plates to reduce viscous drag.

DESCRIPTION OF THE PRIOR ART

The prior art contains many wet clutches for automotive applications wherein cooling lubricant or oil is directed over clutch plates, for example such as is described in U.S. Pat. No. 3,474,888. One persisting problem which has inhibited large-scale acceptance of wet clutches has been the problem of viscous drag between clutch plates when they are disengaged. Excessive drag results in driveability problems having symptoms such as difficulty in getting a manual transmission into and out of gear, vehicle creep with the clutch released, and/or hard shifting when executing up or down shifts. Drag is caused by the presence of an oil film between the clutch plates of the driving and driven members of the clutch when the pressure plate is retracted to release the clutch. In the presence of a continuous oil flow, the clearance between the disengaged clutch plates is continuously filled with a film of oil. Because of the viscosity of the oil, there is a reaction to shearing the oil film, thus creating a torque on the driven member, when there should be no forces or torque on the driven member such as when the clutch is released to disconnect the running engine from the rest of the power train. This viscous shearing is dependent upon the film thickness or clearance between the clutch plates, the shear rate or relative speed between the clutch plates, and the viscous properties of the oil.

Over the years, there has been much activity toward solving this problem. New friction materials, new grooving patterns in the clutch plates, additional pressure plate retraction to provide more clearance, and new oil formulations have been utilized to reduce viscous effects to tolerable levels. It is noted that wet clutches are usually equipped with a transmission-mounted clutch brake which serves to facilitate getting into gear at start-up by stopping the rotation of the transmission as well as aiding upshifting while driving.

Another technique utilized in the prior art has been to halt or reduce oil flow to the clutch plates when the plates are disengaged. Systems suitable for manually operated clutches are exemplified in U.S. Pat. Nos. 3,351,169; 3,773,157; and 4,142,619 wherein the U.S. Pat. No. 3,351,169 utilizes a valving system operated by the clutch lever and the other two patents utilize dumping or diverting valve system for diverting the flow of fluid away from the clutch plates. Examples of systems suitable for automatic transmissions include clutches described in U.S. Pat. Nos. 3,823,802; 4,134,483; and 4,270,647 wherein annular members or protrusions on hydraulically operated actuating plates partially restrict the flow of oil from radial openings during disengagement of the clutch plates. The prior art clutches with lubricating oil flow control generally suffer from one or more deficiencies, such as requiring extra valving parts, thus adding to the cost and complexity; not completely cutting oil flow off to thus maintain a substantial film subject to viscous drag; and/or not being suitable for manually operated, spring-loaded engine disconnect wet clutches.

SUMMARY OF THE INVENTION

The invention is summarized in a wet clutch with an oil cut-off during disengagement wherein the wet clutch includes an actuator collar slideably mounted on a coaxial oil feed tube and having an annular oil feeding channel positioned relative to radial openings in the tube so that the openings are completely closed by the collar when the actuator collar is moved to disengage the clutch plates and the annular channel is aligned with the radial openings in the tube when the actuator is withdrawn to engage the clutch plates.

An object of the invention is to construct a wet clutch with a lubricant flow control utilizing a minimum number of parts to reduce cost and complexity.

Another object of the invention is to construct an oil flow shut-off for a wet clutch which is suitable for incorporation in manually operated, spring-loaded engine disconnect wet clutches.

It is yet another object of the invention to design an oil flow control arrangement which can be made by a relative simple modification of presently manufactured clutches.

One advantage of the invention is that the particular arrangement achieves complete oil flow cut-off without the addition of separate valving parts in a wet clutch.

One feature of the invention is the avoidance of in-service clutch adjustments to reduce maintenance expense.

Other objects, advantages and features of the invention will be apparent from the following description of the preferred embodiment, taken in conjunction with the accompanying drawings.

DESCRIPTION OF THE PREFERRED EMBODIMENT

Figure 1:
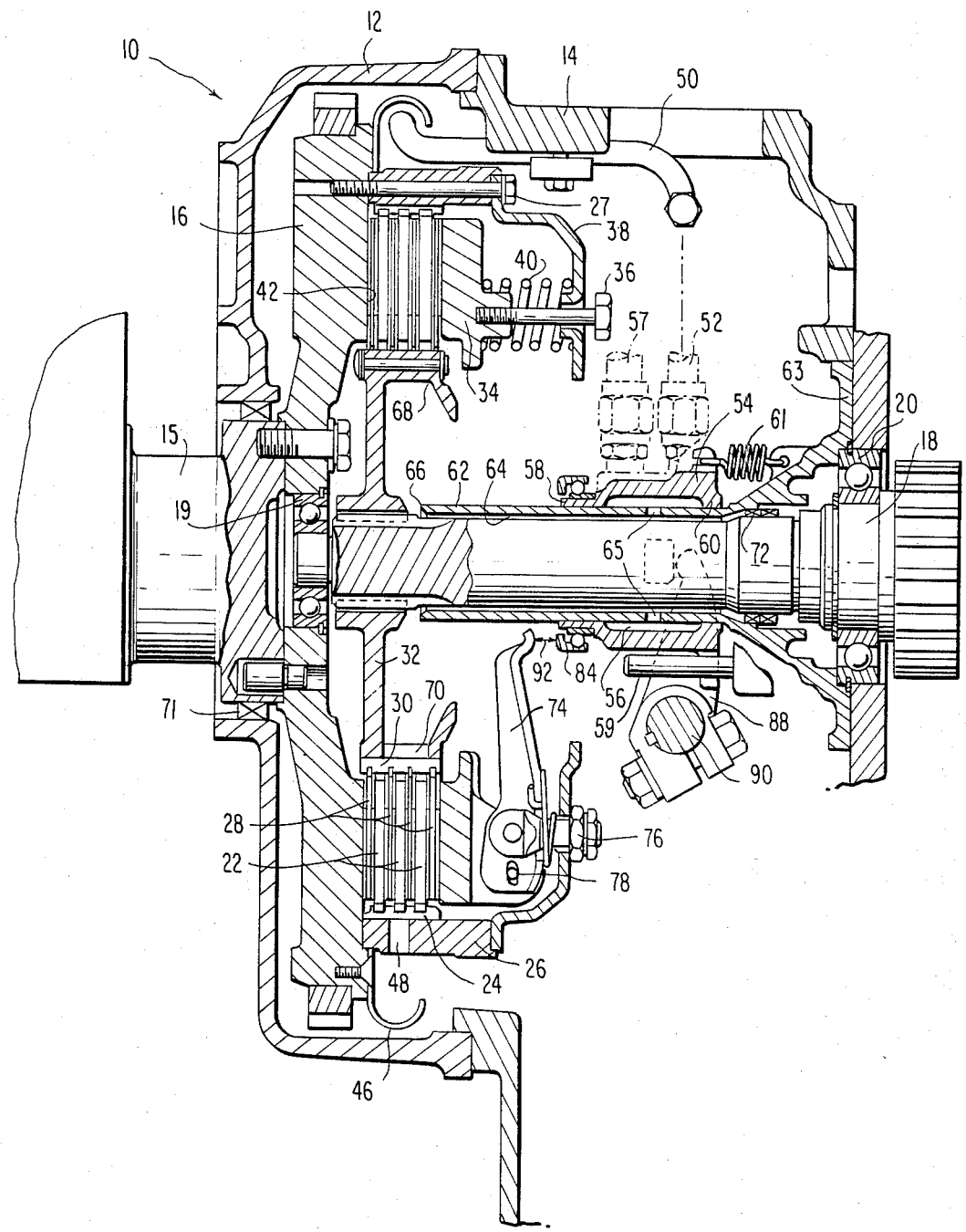
FIG. 1 is a section view of a clutch, with portions broken away, in accordance with the invention.

As illustrated in FIG. 1, one embodiment of the invention is incorporated in a clutch illustrated generally at 10 and including a housing formed by housing members 12 and 14 bolted together and mounted in a vehicle between a motor (not shown) and a transmission (not shown). A crankshaft 15 of the motor extends into one side of the housing through an opening in the housing member 12. A flywheel 16 is mounted on the end of the crankshaft 15 within the housing. An output shaft 18 with a transmission drive pinion on its exterior end extends into the opposite side of the housing coaxial with the crankshaft 15 and is rotatably supported by a bearing 19 in the flywheel 16 and a bearing 20 in the transmission housing. First clutch plates 22 are slideably mounted for limited axial sliding movement on internal splines 24 of a rim 26 secured by bolts 27 to the flywheel 16. Second clutch plates 28, interleaved with the clutch plates 22, are slideably mounted for limited axial sliding movement on external splines 30 on a hub 32 secured on the shaft 18. A pressure plate 34 is slidingly secured by bolts 36 to an annular support 38 which is fastened by the rim bolts 27 to the flywheel. Compression springs 40 are interposed between the pressure plate 34 and the support 38 for normally urging the pressure plate 34 to clamp the clutch plates 22 and 28 together between the pressure plate 34 and a face 42 of the flywheel whereby the clutch is engaged.

Figure 5:
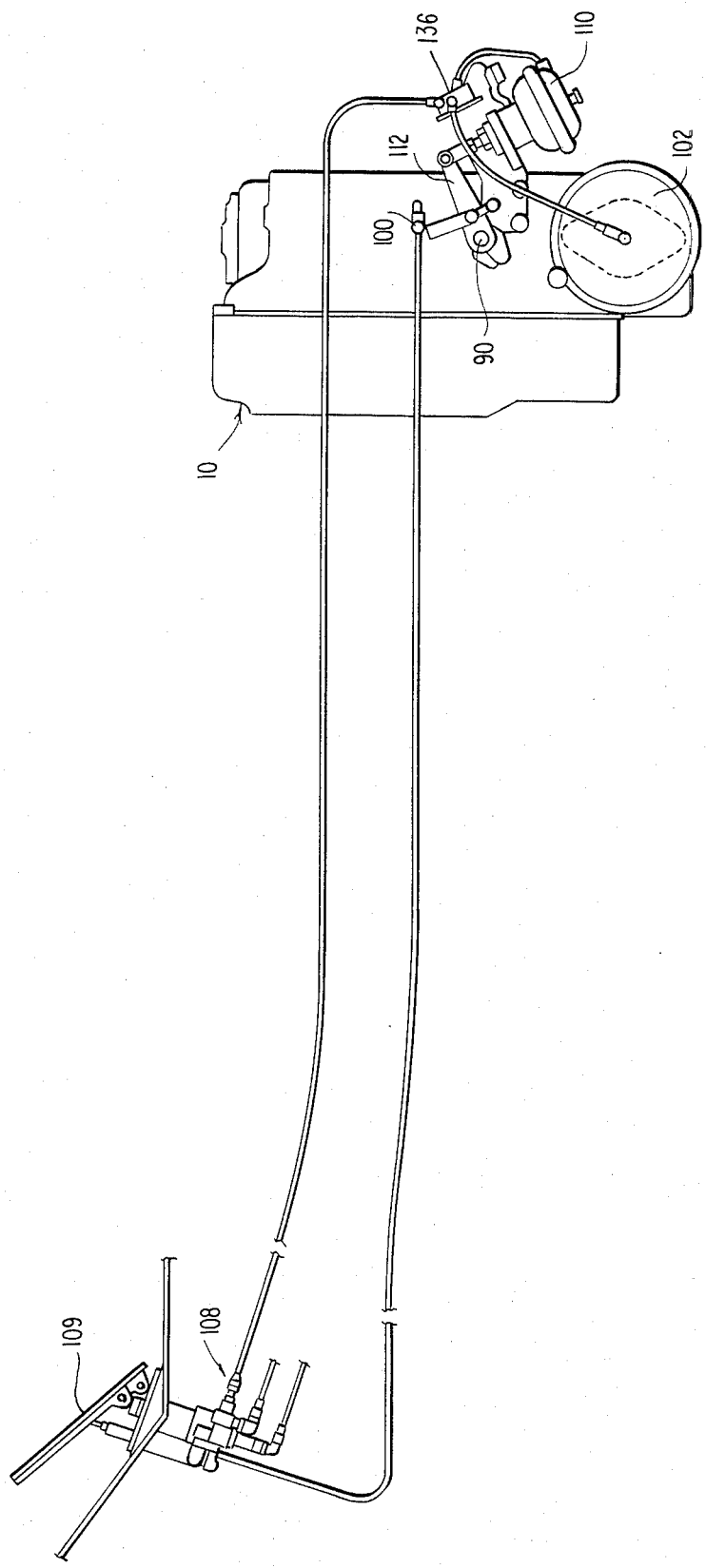
FIG. 5 is a diagram of a clutch system which utilizes air pressure to operate the clutch.
Figure 6:
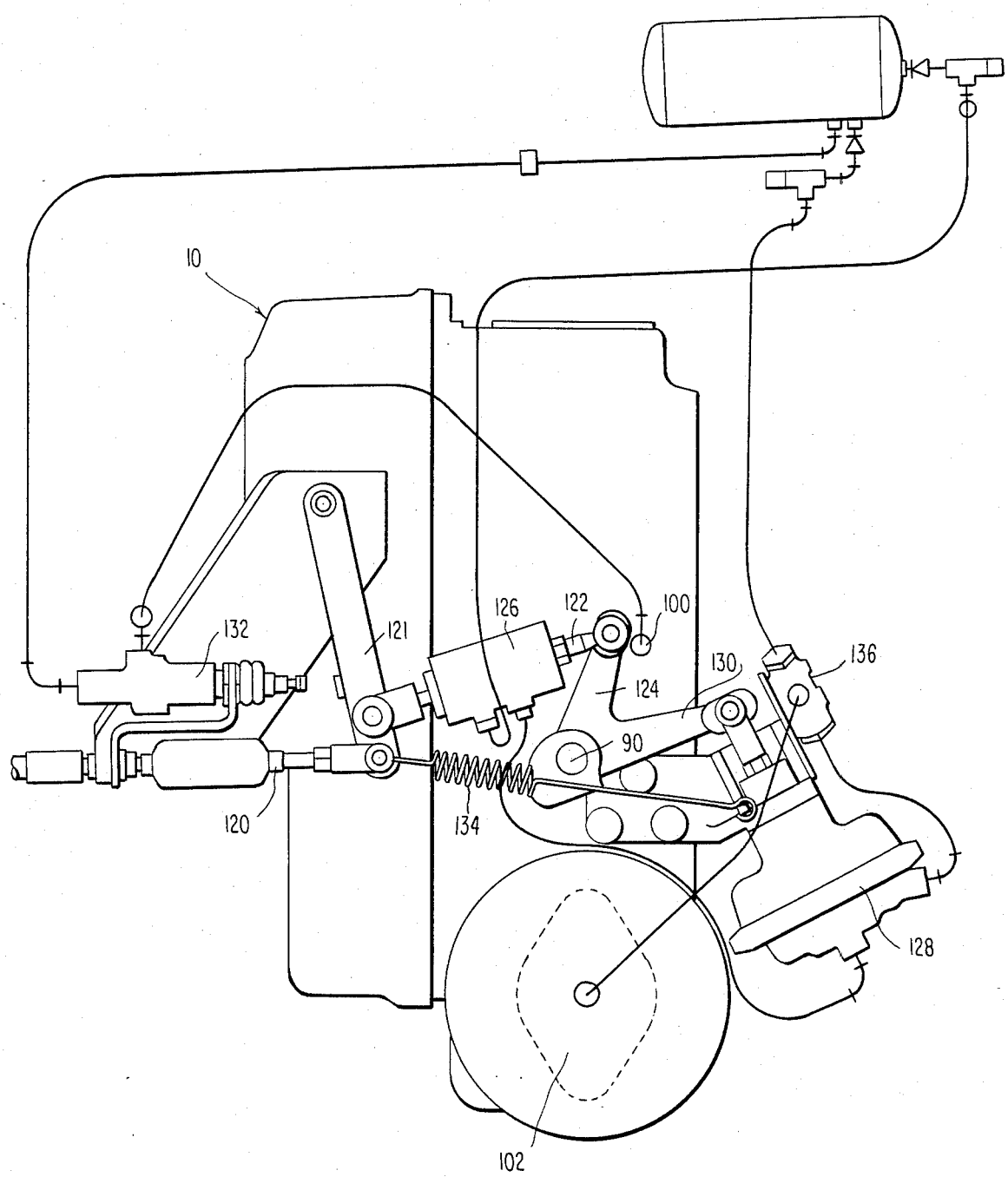
FIG. 6 is a diagram of a clutch system which utilizes air pressure to assist in operation of the clutch.

An annular channel member or oil collecting ring 46 with an inside channel for receiving lubricant or oil is mounted on the periphery of the flywheel 16 outside of the rim 26 which has openings 48 for centrifugally discharging the oil from the clutch plates to the dump and collecting ring 46. Oil sump level raising and lowering facilities 102, FIGS. 5 and 6, are provided for raising the oil level in the sump above the bottom portion of the ring 46 to feed oil to the ring during clutch disengaging and engaging cycles. A stationary pipe 50 has one end extending tangentially into the channel of the collecting ring 46 for receiving a stream of oil collected within the ring 46, the oil being under pressure within the pipe 50 due to the rotating movement of the collector ring. The other end of the pipe 50 is connected to one end of a hose 52 which has its other end connected to an actuating collar 54 wherein the hose communicates with an interior annular channel 56 formed in the collar 54. The actuating collar 54 includes end lip portions 58 and 60 slideably engaging the exterior of a tube 62 which is mounted by flange portion 63 in an opening in the housing member 14 and extends coaxially over the shaft 18. The end lip portions 58 and 60 substantially seal the interior channel 56 of the actuator oil collar 54 so that the channel 56 forms a moveable oil supply passage or chamber surrounding the tube 62. Guide 59 is mounted on the housing for restricting the collar 54 to axial sliding movement to prevent rotation of the collar. Tension spring 61 biases the actuator collar 54 to the right as shown in FIG. 1. A hose 57 connects the channel 56 to a pressure gauge (not shown).

Figure 2:
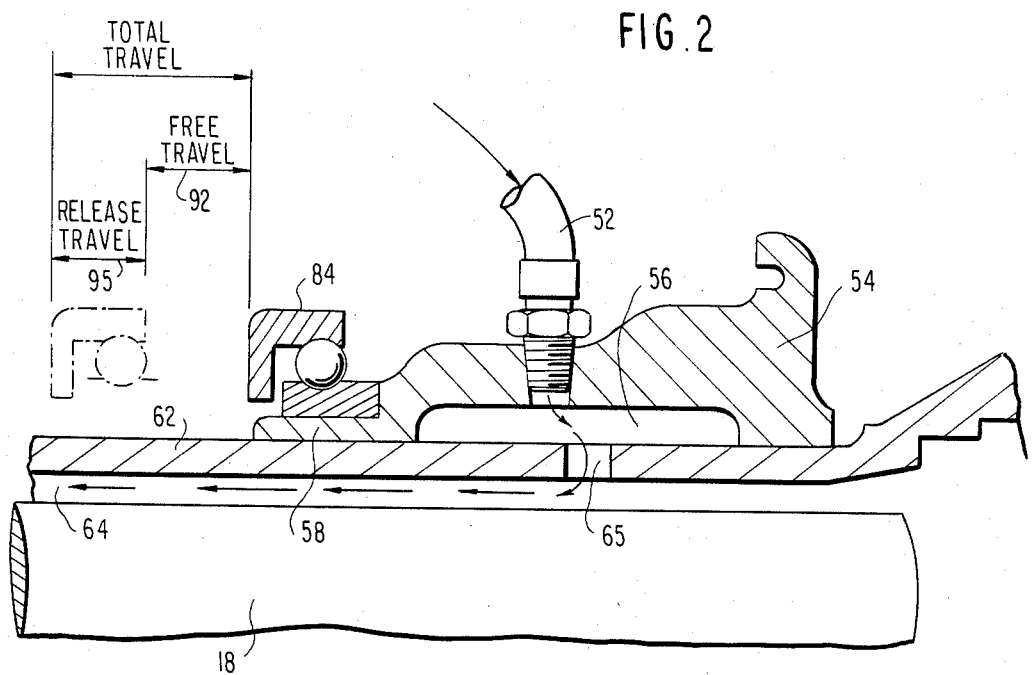
FIG. 2 is a section view of a broken-away portion of the clutch of FIG. 1 illustrating an actuator collar in an engaged clutch position.

The tube 62 is spaced from the shaft 18 to form an annular conduit 64 around the shaft and has radial openings 65 circumferentially spaced thereabout for communication between the chamber 56 and the conduit 64, see FIG. 2. The distal end 66 of the tube is open adjacent to the hub 32 for discharging the oil flow at the center of the hub. The hub 32 includes an interior channel 68 on its rim portion which extends around the discharge end 66 of the tube 62 for collecting the oil which is discharged from the tube. Passages 70 are formed in the rim of the hub 32 for directing oil collected within the channel 68 over the clutch plates 22 and 28. Seals 71 and 72 seal the shafts 15 and 18 to prevent oil leakage from the clutch housing.

Figure 4:
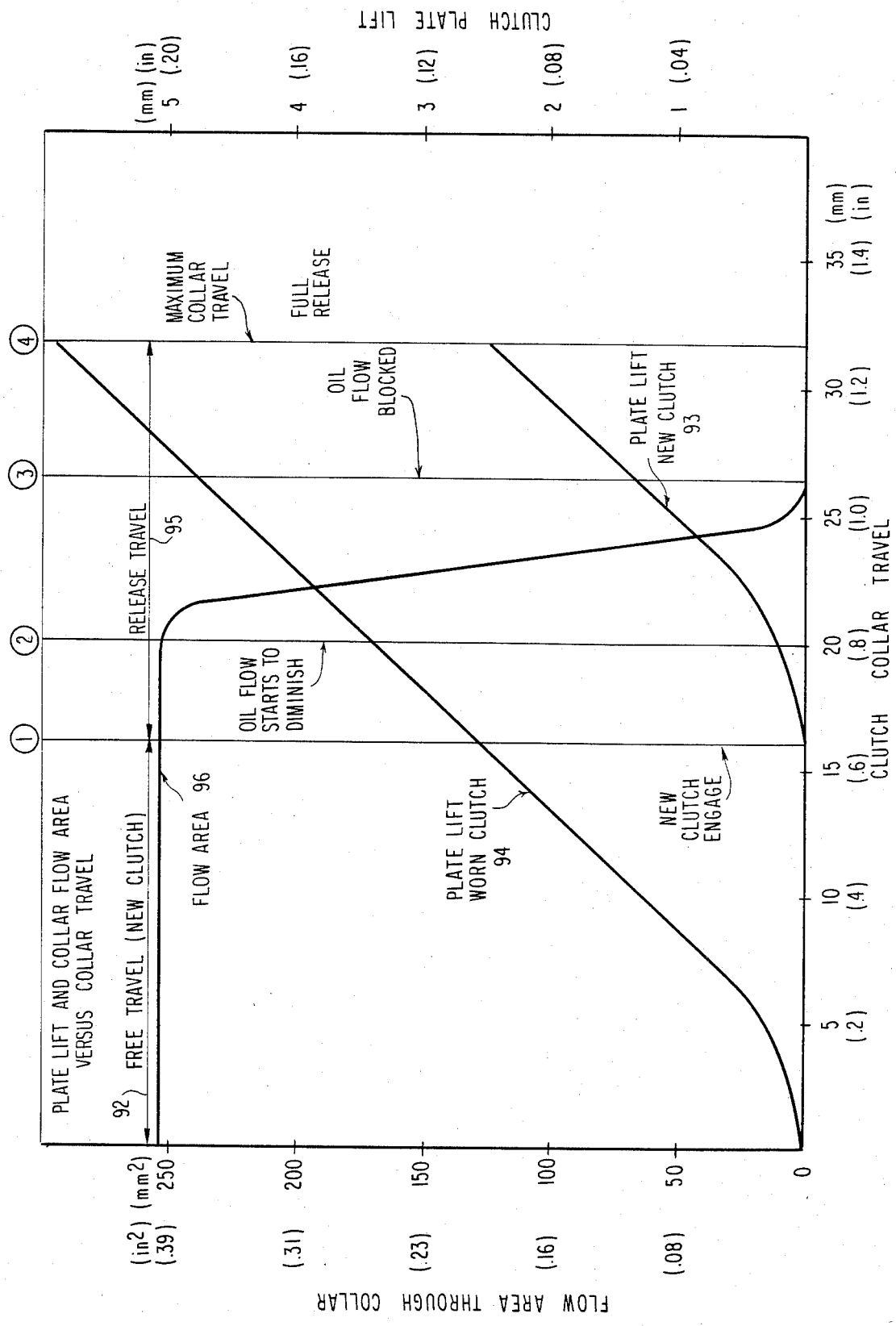
FIG. 4 is a graph illustrating oil flow as well as clutch plate lift for both new and worn clutch plates during actuator collar travel.

Clutch release levers 74 are pivotally mounted by pivot members 76 on the support 38 to extend radially around the tube 62. Outer ends of the levers 74 are coupled by pivots 78 to the pressure plate 34 and have inner ends aligned for being engaged by a release bearing 84 mounted on the end portion 58 of the actuator collar 54. The actuator collar 54 is engaged by a yoke 88 fastened on a clutch operating shaft 90 which is rotated in a conventional manner for operating the clutch. The spacing 92 between the inner ends of the levers 74 and the release bearing 84 is set equal to the wear-out travel or free travel of a new clutch to thus provide a no-adjustment feature for the clutch. In the graph of FIG. 4, the free travel 92, together with release travel 95 and curves 93 and 94 for clutch plate lift for new and worn clutches respectively, are illustrated. For a new clutch, the release travel 95 begins after actuator collar advancement equal to about 50% of the total free and release travel. For both new and old clutches, the openings 65 are such that oil flow starts to diminish after actuator collar advancement equal to about 60% of total free and release travel, and oil flow is blocked after actuator collar advancement equal to about 80% of total free and release travel.

Figure 3:
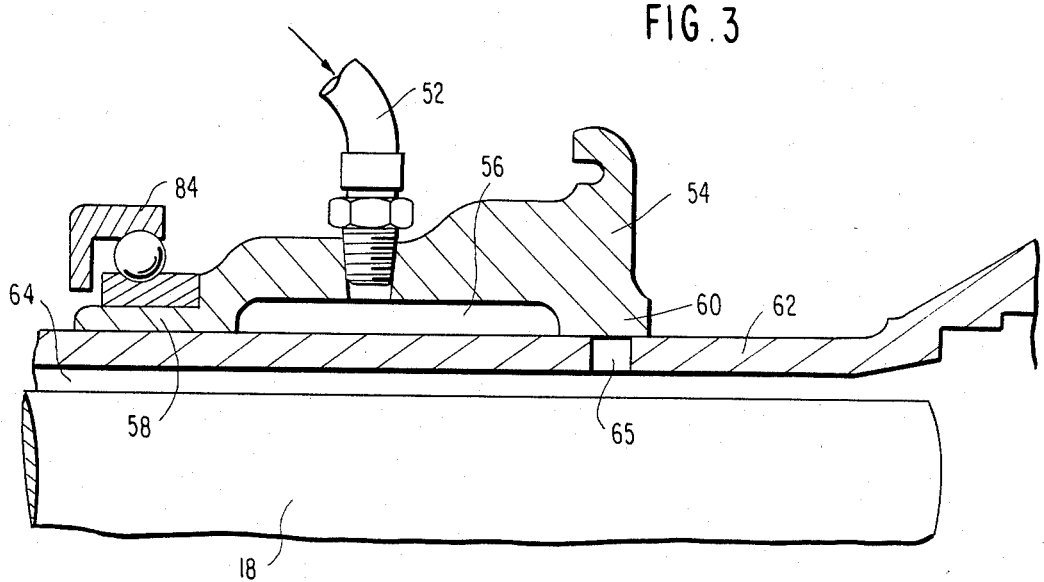
FIG. 3 is a view similar to FIG. 2 but illustrating the actuator collar in a disengaged clutch position.

The clutch arrangement as described above is substantially similar to prior art clutches. The clutch differs from the prior art in that the position of the radial tube openings 65 relative to the collar channel 56 is selected so that oil flow is cut off when the clutch is fully disengaged. The lip portion 60 is designed to extend over and close the tube openings 65 as shown in FIG. 3 when the actuator collar 54 is fully advanced to the left to disengage the clutch. Curve 96 in FIG. 4 illustrates the area of the openings 65 versus clutch collar travel. Oil flow is established during the clutch engaging cycle beginning before the clutch plates are fully engaged, and during the clutch disengaging cycle, for at least an initial portion of the clutch plate lift movement. Preferably, full oil flow is maintained while clutch plate lift is less than about 0.2 millimeters for a four-plate clutch as illustrated in FIG. 4, or about 0.02 millimeters per pair of engaging faces. At least partial oil flow is maintained while the clutch plate lift is about 1.3 millimeters for a four plate clutch as illustrated in FIG. 4 or about 0.16 millimeters per pair of clutch surfaces.

In operation of the clutch of FIGS. 1–4, disengagement of the clutch is produced by rotating the operating shaft 90 to engage the yoke 88 with the actuator collar 54, moving the actuator collar to the left as viewed in FIG. 1. The actuator collar will move freely through the free travel distance 92; as shown in FIG. 4, the free travel distance 92 is decreased with a corresponding increase in release travel distance 95 as the clutch plates become worn until the condition of curve 94 is reached where there is no free travel and the clutch plates need replacing. At the end of the free travel, the actuator bearing 84 engages the inner ends of the levers 74 to begin pivoting the levers to move the pressure plate 34 against the bias of the springs 40. During the initial portion of the release movement 94 of the clutch plates, substantially full oil flow is maintained over the clutch plates. After the clutch plates have separated a substantial distance or at least about 0.02 millimeters per pair of clutch surfaces, the end lip portion 60 of the collar starts to close the openings 65 in the tube 62. When the clutch plates are substantially completely separated or spaced at least about 0.16 millimeters per pair of clutch surfaces, the oil flow is substantially completely stopped, except for minor leakage, by the lip portion 60 completely covering the openings 65.

During re-engagement of the clutch, the operating shaft 90 is rotated in the opposite direction to pivot the yoke 88 and move the actuating collar 54 to the right as shown in FIG. 1. After an initial movement, the lip 60 starts to uncover the openings 65 in the tube 62, resulting in a beginning of oil flow over the clutch plates. This oil flow begins while the clutch plates are still substantially separated, i.e., at least about 0.16 millimeters spacing per pair of clutch surfaces. As the actuator continues movement to the right, the openings 65 become fully open, establishing full oil flow. During the actuator movement and the establishment of full oil flow, the levers 74 pivot, releasing the pressure plate 34 to begin closing of the clutch plates 22 and 28 toward each other. The full flow of oil is established before the clutch plates engage, i.e., while the clutch lift is at least about 0.02 millimeters per pair of clutch surfaces. Continuing movement of the actuator 54 then brings about full engagement of the clutch plates as well as withdrawing the actuator collar from engagement with the inner ends of the levers 74 by the length of free travel 92.

The present invention results in termination of oil flow upon complete disengagement of the clutch plates to reduce viscous drag caused by oil flowing between the clutch plates. This is particularly done without adding additional parts or valves and is accomplished by a modification to the oil flow channel 56 in the actuating collar as well as to the relative position of the openings in the tube 62. Testing has shown that the present invention diminishes viscous drag by 95% in comparison to a prior system without oil shut off.

The combination of the present oil shut off arrangement with the no-adjustment arrangement results in additional benefits. Wearing of the clutch plates decreases free travel but increases clutch plate lift which reduces drag. As the clutch plates wear, full oil flow is established earlier in the clutch disengaging cycle, i.e., while the clutch plates are spaced further apart, and is maintained longer during the clutch engaging cycle to provide additional insurance that clutch plate life is prolonged.

Typical clutch systems employing the clutch 10 are illustrated in FIGS. 5 and 6. Both of these systems include a conventional air operated transmission brake inlet 100 and an air operated sump oil level control 102. The transmission brake (not shown) is engaged when the clutch is disengaged to retard rotation of the clutch output, and the oil sump control 102 raises the level of oil to insure oil in the collector ring 46 during disengagement and engagement cycles of the clutch. When the clutch is fully engaged, the transmission brake is disengaged and the oil level is lowered to reduce splashing and heating of the oil. The clutch system of FIG. 5 is an air control system and includes a valve arrangement 108 operated by the foot pedal 109 and controlling the transmission brake as well as an air operator 110 rotating an arm 112 mounted on the clutch operating shaft 90 to operate the clutch. The clutch system of FIG. 6 is an air assisted clutch system and includes a clutch cable 120 from the foot pedal (not shown) and connected to a pivotal arm 121 which is connected by a linkage 122 to one arm 124 of a dual arm lever secured on the clutch operating shaft 90. A pressure control valve 126 on the linkage 122 controls operation of an air operator 128 fastened to the other arm 130 of the dual operating arm to assist in operation of the clutch. A valve 132 engaged by the lever 121 when the clutch is disengaged operates the transmission brake. The valve 126 in the air assist system of FIG. 6 and the corresponding valve in the valve arrangement 108 of FIG. 5 produce air pressure output proportional to valve operator displacement so that the pneumatic actuators 110 and 128 respond proportionally to valve operator displacement. On the air assist system of FIG. 6, an addition spring 134 is added to provide additional resistance to initial clutch pedal displacement. Alternatively, this spring could be located inside the actuator 128. Valve 136 operates the sump level control 102 when air pressure is applied to the actuator 110 or 128.

The present oil shut off arrangement is also fully adaptable to clutches operated completely by manual means, such as clutch cables, linkages, or other means connecting the clutch pedals to the clutch operating levers without the air assist actuator 128.

Since many modifications, variations, and changes in detail may be made to the above described embodiment, it is intended that all matter described above and shown in the accompanying drawings be interpreted as illustrative and not in a limiting sense.

What is claimed is:

1. A wet clutch with oil cutoff during disengagement, comprising:

a housing, a drive member extending into the housing and having first clutch plate means mounted thereon, a driven member extending into the housing and having second clutch plate means mounted thereon in operative relationship with the first clutch plate means, one of said members including a shaft and a hub mounted on the shaft supporting the corresponding clutch plate means, a tube mounted on the housing and extending coaxially over the shaft in spaced relationship to the shaft to form an annular conduit for oil, said tube having a distal open end adjacent the hub, said hub having means for directing oil from the distal open end of the tube to both of the clutch plate means, clutch pressure and release means including a plurality of levers radially extending around the tube for disengaging and engaging the first and second clutch plate means with each other when inner end means on the levers is pivoted axially relative to the tube toward and away from the open distal end of the tube, an actuator collar slidably mounted on the tube for movement between fully advanced and fully retracted positions and including a bearing for engaging and disengaging the inner end means on the levers to disengage and engage the first and second clutch plate means during advancement and retraction of the actuator collar, said inner end means on the levers being spaced from the bearing when the actuator collar is in the fully retracted position by a distance about equal to a change in lever position due to permissible wear of the clutch plate means so as to provide an adjustment free clutch, said actuator collar having opposite and lip portions and an inner annular channel defined between the opposite end lip portions of the collar wherein the opposite end lip portions slideably engage the tube and the annular channel forms an axially movable annular chamber surrounding the tube means in the housing for collecting and supplying oil under pressure to the annular chamber, and a plurality of radial openings in the tube positioned for communicating between the annular chamber and the annular conduit when the actuator collar is in any position between the fully retracted position and an intermediate advanced position which corresponds to at least about 0.02 millimeter clutch plate lift per pair of new clutch engaging surfaces and for being substantially closed from the annular chamber by a trailing lip portion of the end lip portions when the actuator collar is advanced to a position between the fully advanced position and the intermediate position.

2. A wet clutch with oil cutoff during disengagement as claimed in claim 1 wherein oil flow is maintained for at least about 0.16 millimeters clutch plate lift per pair of clutch engaging surfaces.

3. A wet clutch with oil cutoff during disengagement as claimed in claim 1 including a clutch operating shaft and a clutch yoke mounted on the shaft for engaging the actuator collar to move the actuator collar.

4. A wet clutch with oil cutoff during disengagement as claimed in claim 3 including air operator means for rotating the clutch operating shaft to operate the clutch.

5. A wet clutch with oil cutoff during disengagement as claimed in claim 3 including air operator means connected to the clutch operating shaft, linkage and lever means connected to the clutch operating shaft to operate the clutch, and valve means connected to the linkage and lever means to operate the air operator means whereby the air operator means assists the operation of the clutch.

6. A wet clutch as claimed in claim 1 wherein
the spacing of the inner end means on the levers from the bearing is such that, for new clutch plates, the disengagement of the clutch plates begins after advancement of the actuator collar equal to about 50% of total free and release travel of the actuator collar; and
the radial openings and their positioning is such that oil flow cutoff begins after actuator collar advancement equal to about 60% of the total free and release travel of the actuator collar, and oil flow is blocked after about 80% of total free and release travel.

* * * * *